United States Patent [19]
Chubb et al.

[11] Patent Number: 6,061,953
[45] Date of Patent: May 16, 2000

[54] POTTED PLANT PROTECTOR DEVICE

[75] Inventors: Deborah C. Chubb; Christopher P. Chubb, both of Marietta, Ga.

[73] Assignee: Four Suns, LLC, Marietta, Ga.

[21] Appl. No.: 09/294,963

[22] Filed: Apr. 20, 1999

[51] Int. Cl.$^7$ .................................................. A01G 13/02
[52] U.S. Cl. ........................................................ 47/28.1
[58] Field of Search ............................ 47/26, 28.1, 31

[56] References Cited

U.S. PATENT DOCUMENTS

| | | | |
|---|---|---|---|
| 98,892 | 1/1870 | Sprague | 47/28.1 |
| 212,306 | 2/1879 | Frederick | 47/28.1 |
| 1,061,547 | 5/1913 | Kennedy et al. | 47/28.1 |
| 2,009,867 | 7/1935 | Ball | 47/28.1 |
| 2,014,175 | 9/1935 | Hart | 47/35 |
| 2,051,596 | 8/1936 | Harbaugh | 47/28.1 |
| 2,181,016 | 11/1939 | Gross | 47/28.1 |
| 2,209,891 | 7/1940 | Hoover . | |
| 4,265,049 | 5/1981 | Gorewitz . | |
| 4,403,443 | 9/1983 | Valente . | |
| 4,995,192 | 2/1991 | DeWild . | |
| 5,150,867 | 9/1992 | Pesapane . | |
| 5,398,443 | 3/1995 | Johnston et al. . | |

*Primary Examiner*—Thomas Price
*Attorney, Agent, or Firm*—Jones & Askew, LLP

[57] ABSTRACT

A potted plant protector device comprising a base, arms and fingers extending therefrom in a generally dome-shaped pattern is provided. The circumference of the base can be adapted for a variety of plant container circumferences. The arms are flexibly movable for installation and removal to permit configuration around a variety of plant trunks, branches, stalks, and stems. The fingers selectively engage one another to permit structural integrity when the device is in position on a potted plant.

36 Claims, 4 Drawing Sheets

POTTED PLANT PROTECTOR DEVICE

BACKGROUND

Flower pots provide a convenient means for growing a variety of useful and decorative greenery in portable, reusable containers. In the homes of those with small children or pets, however, the spillage of soil from potted plants and the destruction of fragile plant tissues can be a perpetual problem.

Prior art potted plant accessories have assisted in regulating air, sun and water (U.S. Pat. No. 5,398,443 and U.S. Pat. No. 4,995,192), or supported decorative mulch dressing (U.S. Pat. No. 5,150,867). Prior devices which prevent spillage of soil from an overturned flower pot, such as U.S. Pat. No. 4,403,443, are not presently adaptable for the growth of other than centrally stalked plant varieties. Conventional planter accessories do not provide adequate adaptability for plants of varying trunk and limb profiles.

What is needed is a potted plant protector device that provides support and protection from the environment, and that has the capacity to be used on a wide variety of plants. What is needed is a flexible plant protector that can be easily installed upon and removed from existing potted plants.

SUMMARY OF THE INVENTION

The present invention provides a potted plant protector device which provides protection and support for a variety of plants. The device has numerous openings therethrough to facilitate the growth of multiple plant stalks or trunks. The invention provides a versatile, flexible design permitting adaptation and installation to existing potted plants.

The present invention provides a device comprising a base, arms and fingers extending therefrom in a generally dome-shaped pattern. The circumference of the base can be adapted for a variety of plant container circumferences. The arms are flexibly movable for installation and removal to permit configuration around a variety of plant trunks, branches, stalks, and stems. The fingers selectively engage one another, or another arm, to permit structural integrity when the device is in position on a potted plant.

DETAILED DESCRIPTION OF THE INVENTION

Figure 1:
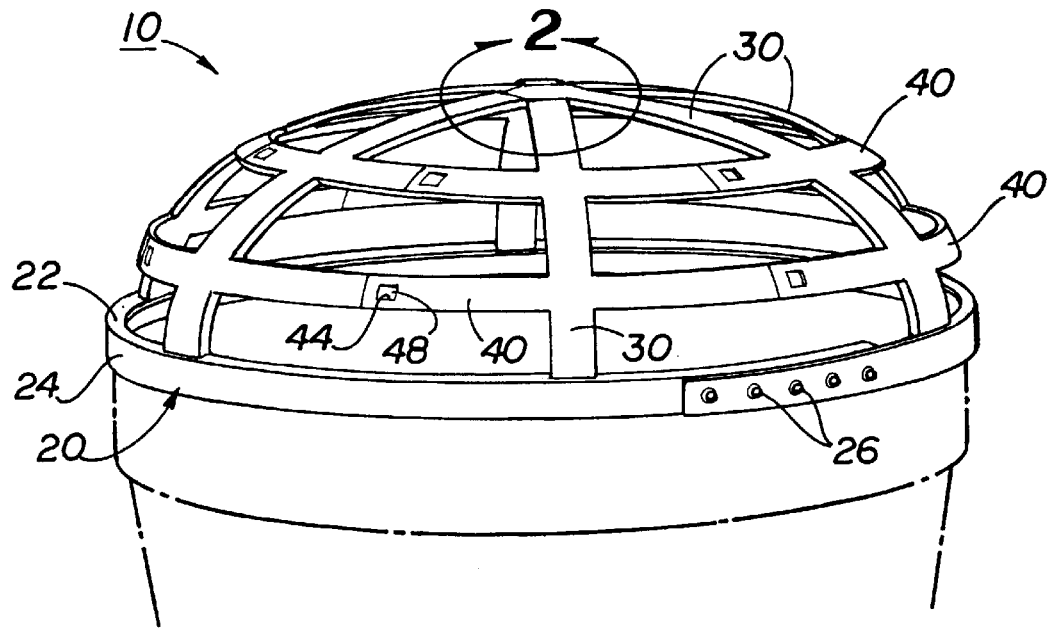
FIG. 1 shows a perspective view of one embodiment of the present invention.

The present invention provides a potted plant protector device comprising a base, arms and fingers, wherein structurally limits the access of mischievous creatures to the container's soil and plants, while providing opportunity for the plants to grow. In particular, the device of the present invention has flexible arms and finger members which can be selectively engaged with one another to permit the easy installation and removal of the device on existing plant roots, stalks, and limbs. Alternative embodiments of the present invention can be readily used on plant containers of any shape, size, or material.

The base of the device has a circumference shaped to encompass the upper rim of the desired plant container. The circumference of the base can be adapted for a variety of plant container circumferences. Typically, the plant container rim, and the base of the device, are round. In alternative embodiments, the planter may be square, rectangular, octagonal, or any shape required to encompass the planter rim. The base can be secured to the container by simple gravity and friction against the container rim. In preferred embodiments, the base has a selectively adjustable circumference with a plurality of sized engaging means that allow the device to be used on plant containers of various diameter, and secured thereto.

Alternatively, the base can be selectively secured to the container through any suitable engaging or locking mechanism. The invention contemplates that device can be especially adapted for individual containers equipped with reciprocating securing means, such as latches.

The device further comprises a plurality of flexible arms each extending in an arc upwardly from opposing points of the base toward each other. The invention contemplates embodiments with two, three, four, five, six or more separate arms extending upwardly from the base. In one preferred embodiment, twelve arms extend upwardly from the base. The arms are preferably, but not necessarily, evenly along the circumference of the base. The arms can be constructed of a material which permits the arm to be flexible when a force is exerted upon the arm individually, but with a structural memory to return to its original inwardly arced configuration. When the fingers are engaged with one another, or another arm, as discussed below, the device has a structural stability that resists external forces. Any of a variety of well-known durable, semi-rigid polymers, such as polyester, polyvinyl, polyethylene, or polypropylene, for example, will work.

Alternatively, in certain embodiments of the invention, the arms can be constructed of a malleable material, which permits selective repositioning of the arms to suit the particular plant configuration. In such an embodiment, the arms can be constructed of a semi-rigid polymer or rubber encasing a metal support wire. The curvature of the arm can be repositioned to avoid a plant stalk by manually bending the arm and its internal wire into a new position.

The entire device can be constructed of the same material, optionally with a malleable internal support wire throughout portions thereof. Additionally, flexibility for moving the arms during installation can be provided by making the polymer material slightly less thick at certain regions, such as at the intersection of each arm with the base. Alternatively, the arms can each be attached to the base by any hinged mechanism.

Each arm extends upwardly from the base, generally arcing toward the middle of the device, in a dome-like pattern. The arms can meet one or more other arms, or fingers, or terminate at a prior point. The arms can converge and selectively engage each other, as for example with a releasable clasp mechanism.

The device further comprises a plurality of flexible fingers extending from each arm. The invention contemplates embodiments with two, three, four, five, six, or more separate fingers extending from each arm. The selective engagement of separate fingers, or fingers with other arms, provides structural integrity to the protector device when in place. The ability to disengage the fingers permits installation of the device around a variety of plants having appendages growing in multiple directions. Thus, various separate plant limbs can extend through separate holes created by engaged fingers and arms. Therefore, the device is not limited to use on plants with only a central trunk.

Each finger of the device can selectively engage another finger from another arm, or can selectively engage another arm. Although in practice, the profile of an individual plant may prevent intended engagement of two adjacent fingers or arms, the engagement of the majority of the fingers will provide the structural stability required to protect the plant and soil from external disturbances. It should be understood that in certain embodiments, there may be multiple points of selective engagement of the fingers and arms. Therefore, an arm or finger may extend across the device toward an engagement point with another arm or finger, and have multiple points of selective engagement therebetween. Such embodiments provide the user with many opportunities to disengage and install the device on a variety of plant configurations.

In an alternative embodiment, the base further comprises a spill-preventative flang continuously extending along the interior circumference of the base. Such a flang can prevent dirt within the container from falling out if the container is pushed over.

Referring to the particular embodiments of the Drawings, FIG. 1 shows a perspective view of one embodiment of the present invention. A device 10 has a base 20 shaped to encompass the rim of a plant container (shown in dashed lines). The base 20 has an upper portion 22 to rest against the upper rim of a plant container and a lateral support portion 24 to encompass the outside of the upper rim of a plant container. The circumference of the base 20 in the embodiment shown is adjustable by engaging means 26. The invention contemplates that the base 20 can have two separate engaging means on opposite sides base 20, so that the entire device 10 can be separated into two pieces for installation and removal.

The device 10 further comprises six resiliently flexible arms 30 extending in an arc upwardly from opposing points of the base 20 toward each other. Each arm 30 has four fingers 40 extending therefrom, which are each selectively engageable with an adjacent finger 40. The arms 30 and fingers 40 are flexible when a force is exerted upon them individually, but when the adjacent fingers 40 are engaged with one another, the device 10 has a structural stability that resists external forces.

Figure 2:
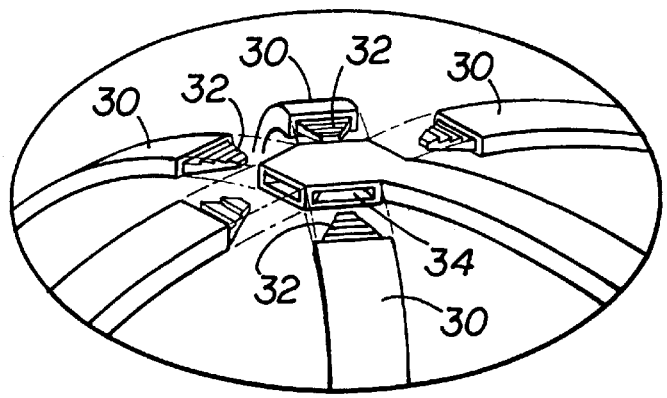
FIG. 2 shows an exploded perspective detail of the arm engaging means of the upper region of the device in FIG. 1 at the area indicated at the inset circle 2.

FIG. 2 shows an exploded perspective detail of the arm 30 engaging means of the upper region of the device 10 in FIG. 1 at the area indicated at circle 2. The engaging means is shown as a grooved tongue member 32 which is inserted into a receiving mouth 34. Not shown is the engaging flange on the bottom of the tongue member 32 of each arm 30 which selectively locks into a reciprocating notch in the bottom of the receiving mouth 34.

Figure 3:
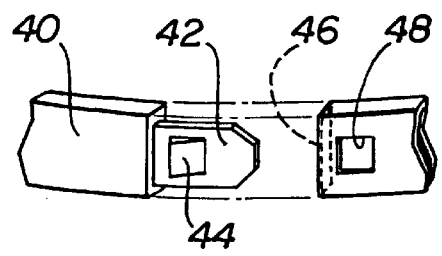
FIG. 3 shows a detail view of a finger engaging means of an embodiment of the present invention.

FIG. 3 shows a detail view of a finger 40 engaging means of an embodiment of the present invention. Fingers 40 on the right side of each arm 30 have a tongue member 42 shaped to be inserted into a receiving member 46 of a finger 40 projection from the left side of an arm 30. The tongue member 42 has a flange 44, which selectively clips into the reciprocating notch 48 of the adjacent finger 40. The fingers 40 can be separated by depressing the flange 44 and removing the tongue member 42 from the receiving member 46.

Figure 4:
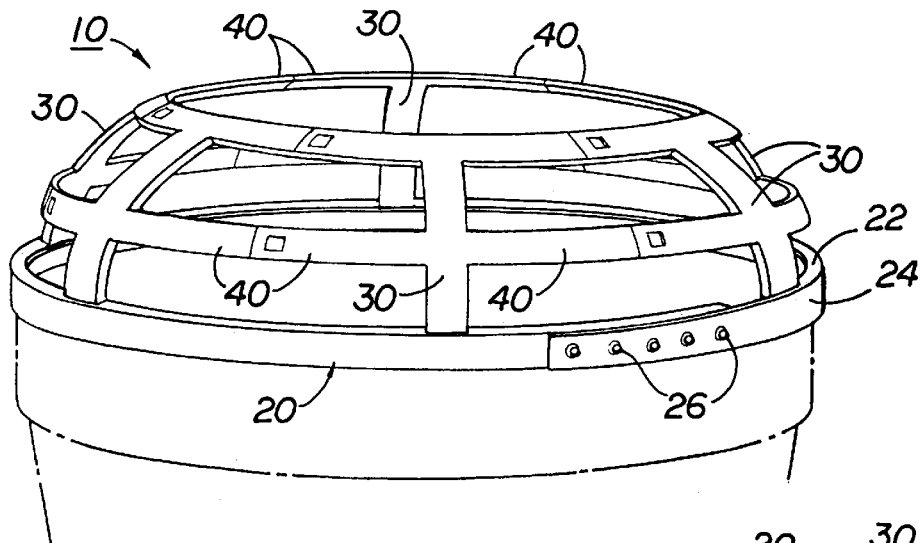
FIG. 4 shows a perspective view of an alternative embodiment of the present invention.

FIG. 4 shows a perspective view of an alternative embodiment of the present invention. In this embodiment, the arms 30 of the device 10 terminate prior to meeting at the center. This embodiment permits use with plants having larger central trunks in particular.

Figure 5:
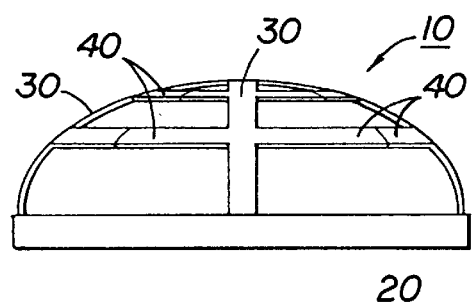
FIG. 5 shows a side view of an alternative embodiment of the present invention having four arms.
Figure 7:
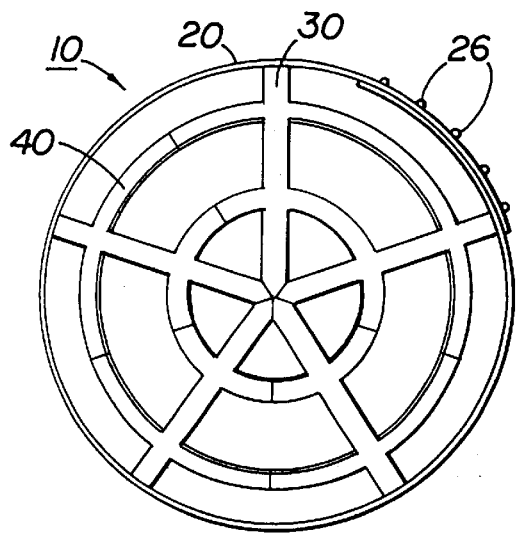
FIG. 7 shows a plan view of an alternative embodiment of the present invention having five arms.
Figure 6:
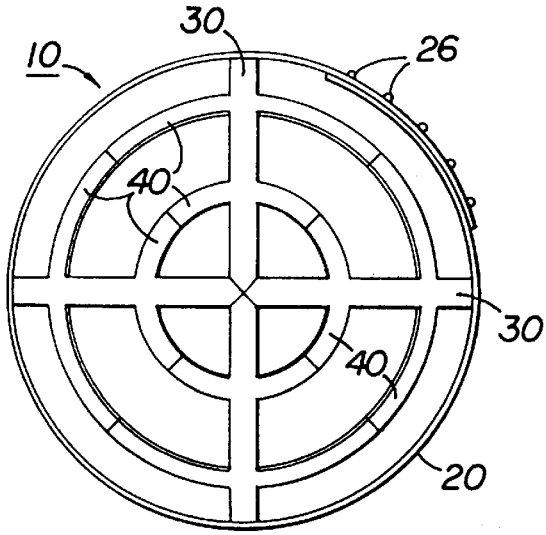
FIG. 6 shows a plan view of an alternative embodiment of the present invention having four arms.
Figure 8:
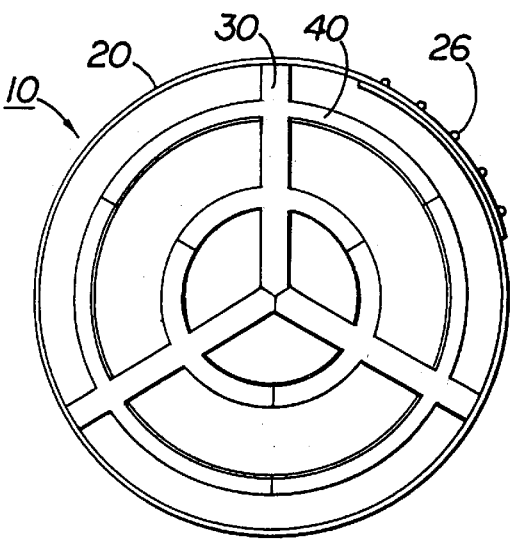
FIG. 8 shows a plan view of an alternative embodiment of the present invention having three arms.

FIG. 5 shows a side view, and FIG. 6 shows a plan view, of an alternative embodiment of the present invention having four arms 30. FIG. 7 shows a plan view of an alternative embodiment of the present invention having five arms 30. FIG. 8 shows a plan view of an alternative embodiment of the present invention having three arms 30.

Figure 9:
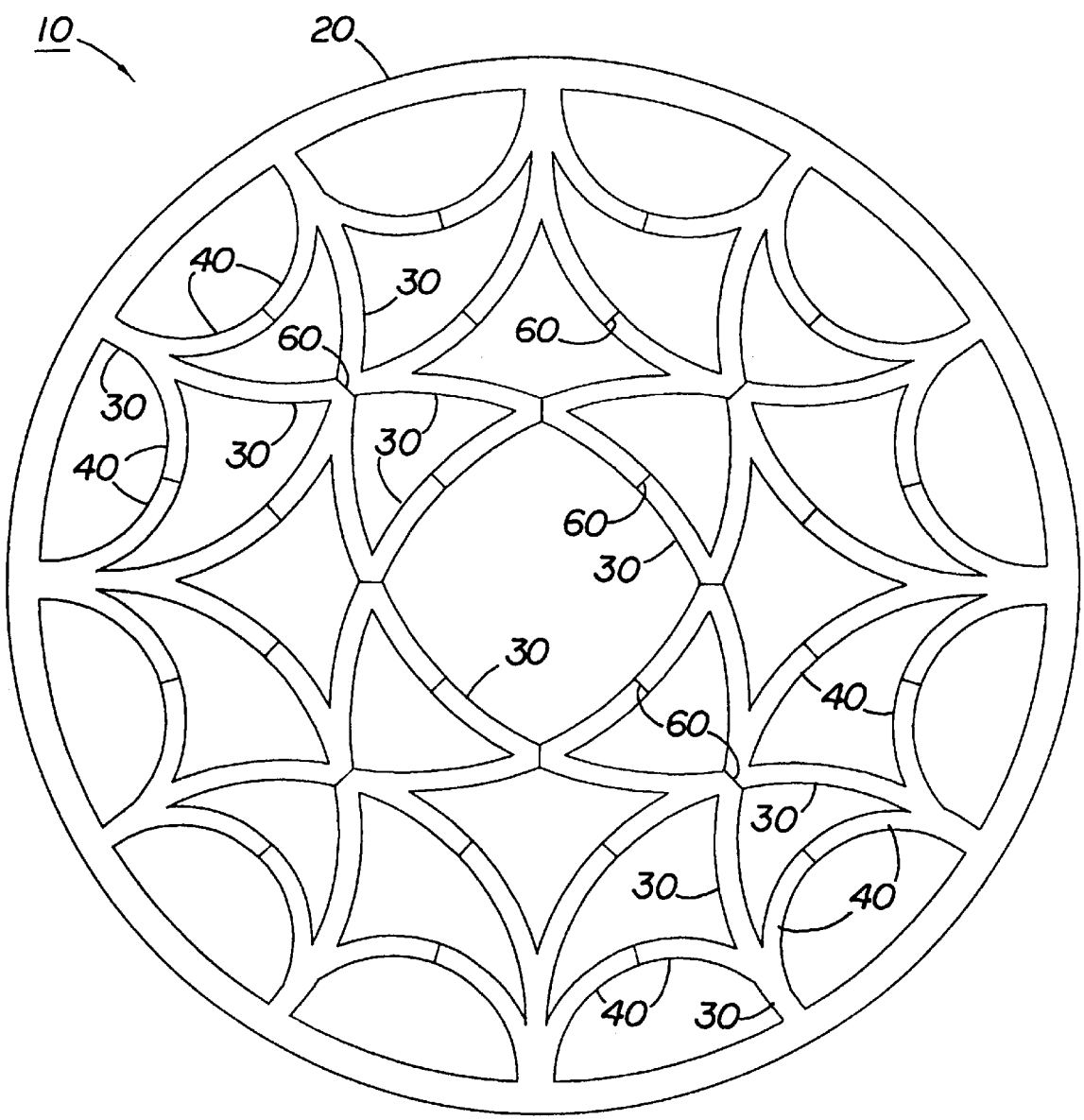
FIG. 9 shows a plan view of an alternative embodiment of the present invention having twelve arms.

FIG. 9 shows an overhead plan view of an alternative embodiment of the present invention having twelve arms 30. In this embodiment, some arms 30 have four fingers 40 extending therefrom, while some arms 30 have two fingers 40 extending therefrom. Arms 30 having two fingers projecting therefrom are also shown extending towards the center to co-extensively meet another arm 30. The invention contemplates that in such embodiments, engaging means can be provided between any intersecting arms 30 and/or fingers 40, or at additional points in between. The engaging means are shown by convergence 60 markings in this embodiment.

Figure 10:
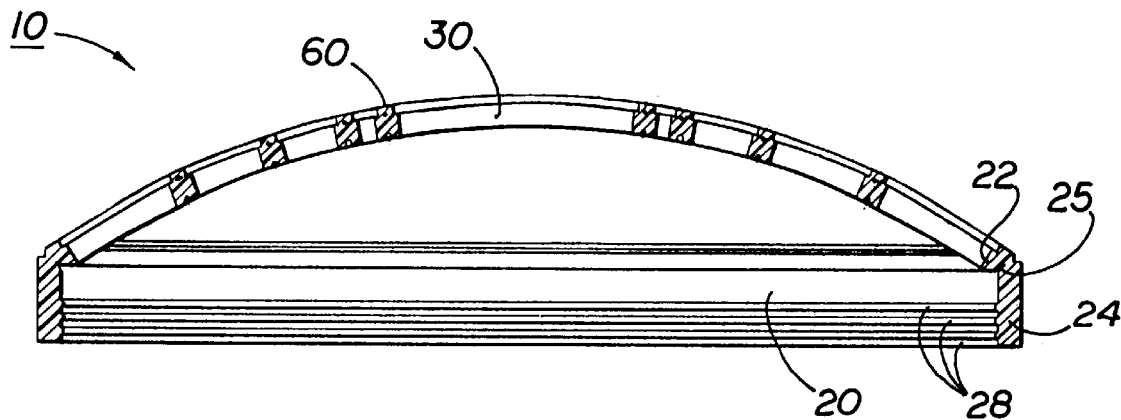
FIG. 10 shows a side view of a median vertical cross-section of an alternative embodiment of the present invention.

FIG. 10 shows a side view of a median vertical cross-section of an alternative embodiment of the present invention. The base 20 is shown having three internally disposed ribs 28 which improve the grip on the plant container. Also shown is an internally recessed ridge 25 between the upper portion 22 lateral support portion 24, which provides a pivoting point for bending the arms 30 during installation and removal of the device 10.

Figure 11:
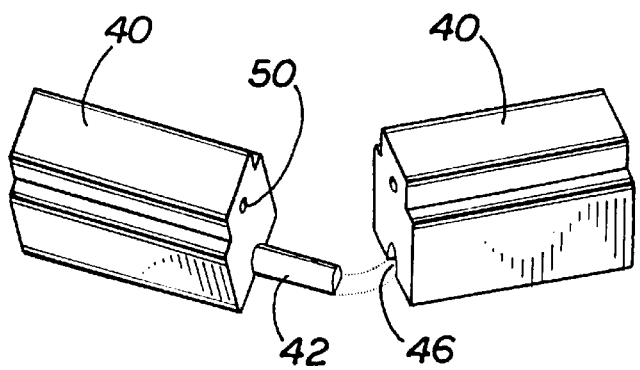
FIG. 11 shows a detail view of a finger engaging means of an alternative embodiment of the present invention.

FIG. 11 shows a detail view of a finger 40 engaging means of an alternative embodiment of the present invention. The finger 40 on the left side has an elongated male member 42 shaped to be inserted into a receiving member 46 of a finger 40 projection from the right side. The male member 42 is preferably somewhat long, about 1 to 1.5 inches, in order to allow engagement of the fingers even if the fingers themselves are not perfectly aligned. This figure also shows a support wire 50 which is encased in the flexible polymer material to provide the finger (or arm in other cases) with additional rigidity and the ability to slightly change the shape of those elements of the device to suit a particular plant configuration.

Figure 12:
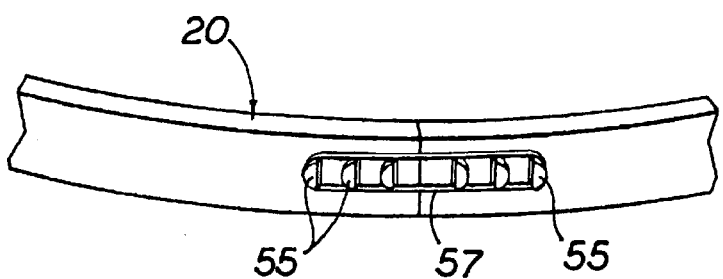
FIG. 12 shows a detail view of a base engaging means of an alternative embodiment of the present invention.

FIG. 12 shows a detail view of an alternate base 20 of the present invention. This base 20 has an adjustable securing means with six nubs 55 which can be alternately bridged by a fastening band 57. This configuration permits variable sizing of the base 20 on a plant container.

The above description of the preferred embodiments is intended to be exemplary of the invention, and not limiting to the appended claims. It is understood that various additional embodiments, modifications, and improvements can be made and are intended to be encompassed within the scope and spirit of the claims.

We claim:

1. A potted plant protector device comprising:
   a base having a circumference shaped to encompass a plant container rim;
   a plurality of flexible arms extending upwardly and inwardly in an arc from the base; and
   a plurality of flexible fingers extending from each arm, wherein at least one finger from each arm can selectively engage another finger or arm.

2. The device of claim 1, wherein the base is round.

3. A potted plant protector device comprising:
   a base having a circumference shaped to encompass a plant container rim, said base comprising an upper portion and a vertical support member;
   a plurality of flexible arms extending upwardly and inwardly in an arc from the base; and
   a plurality of flexible fingers extending from each arm, wherein at least one finger from each arm can selectively engage another finger or arm.

4. The device of claim 3, wherein the arms pivot at the base by an inwardly recessed ridge disposed between the upper portion and a vertical support member.

5. The device of claim 3, wherein the base has a selectively adjustable circumference.

6. The device of claim 3, wherein the device comprises between three and twelve arms.

7. The device of claim 3, wherein each arm comprises three or four fingers.

8. The device of claim 3, wherein each finger selectively engages another finger or arm.

9. The device of claim 3, wherein at least some of the arms, or the fingers, have multiple sites of selective engagement.

10. The device of claim 3, wherein the base further comprises a spill-preventative flange continuously extending along the interior circumference of the base.

11. The device of claim 3, wherein the arms, or the fingers, have a support wire encased in at least a portion thereof.

12. The device of claim 1, wherein at least some of the arms or the fingers have multiple sites of selective engagement.

13. The device of claim 1, wherein the arms or the fingers have a support wire encased in at least a portion thereof.

14. A potted plant protector device comprising:
    a base having a circumference shaped to encompass a plant container rim;
    a plurality of flexible arms extending upwardly and inwardly in an arc from the base, wherein at least some of the arms converge and selectively engage each other; and
    a plurality of flexible fingers extending from each arm, wherein at least one finger from each arm can selectively engage another finger or arm.

15. The device of claim 14, wherein the arms pivot at the base by an inwardly recessed ridge disposed between the upper portion and a vertical support member.

16. The device of claim 14, wherein the base has a selectively adjustable circumference.

17. The device of claim 14, wherein the device comprises between three and twelve arms.

18. The device of claim 14, wherein each arm comprises three or four fingers.

19. The device of claim 14, wherein each finger selectively engages another finger or arm.

20. The device of claim 14, wherein at least some of the arms, or the fingers, have multiple sites of selective engagement.

21. The device of claim 14, wherein the base further comprises a spill-preventative flange continuously extending along the interior circumference of the base.

22. The device of claim 14, wherein the arms, or the fingers, have a support wire encased in at least a portion thereof.

23. A potted plant protector device comprising:
    a base having a circumference shaped to encompass a plant container rim;
    a plurality of flexible arms extending upwardly and inwardly in an arc from the base; and
    a plurality of flexible fingers extending from each arm, wherein at least some of the fingers selectively engage at least one other finger and at least one other arm at a single convergence.

24. The device of claim 23, wherein the arms pivot at the base by an inwardly recessed ridge disposed between the upper portion and a vertical support member.

25. The device of claim 23, wherein the base has a selectively adjustable circumference.

26. The device of claim 23, wherein the device comprises between three and twelve arms.

27. The device of claim 23, wherein each arm comprises three or four fingers.

28. The device of claim 23, wherein each finger selectively engages another finger or arm.

29. The device of claim 23, wherein at least some of the arms, or the fingers, have multiple sites of selective engagement.

30. The device of claim 23, wherein the base further comprises a spill-preventative flange continuously extending along the interior circumference of the base.

31. The device of claim 23, wherein the arms, or the fingers, have a support wire encased in at least a portion thereof.

32. A potted plant protector device comprising:
    a base comprising an upper portion and a vertical support member and having a round selectively adjustable circumference to encompass a plant container rim;
    twelve flexible arms extending upwardly and inwardly in an arc from the base at generally even intervals therealong; and
    a plurality of flexible fingers extending from each arm, wherein four arms have four fingers extending from each arm, and eight arms have two fingers extending from each arm, and wherein at least one finger from each arm can selectively engage another finger or arm.

33. The device of claim 32, wherein the arms converge and selectively engage each other.

34. The device of claim 32, wherein at least some of the arms have multiple sites of selective engagement.

35. The device of claim 32, wherein at least some of the fingers have multiple sites of selective engagement.

36. The device of claim 32, wherein at least some of the fingers selectively engage at least one other finger and at least one other arm at a single convergence.

* * * * *